US009247013B2

(12) United States Patent
Nama et al.

(10) Patent No.: US 9,247,013 B2
(45) Date of Patent: Jan. 26, 2016

(54) SYSTEM FOR REPETITIVELY EXECUTING RULES-BASED CONFIGURABLE BUSINESS APPLICATION OPERATIONS

(71) Applicant: Oracle International Corporation, Redwood Shores, CA (US)

(72) Inventors: Vivek Nama, Dublin, CA (US); Wenhua Li, Palo Alto, CA (US); Amulya Mishra, Jharsuguda (IN); Ravi Dasani, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 284 days.

(21) Appl. No.: 13/791,690

(22) Filed: Mar. 8, 2013

(65) Prior Publication Data
US 2014/0258402 A1 Sep. 11, 2014

(51) Int. Cl.
G06F 15/16 (2006.01)
H04L 29/08 (2006.01)
G06Q 50/00 (2012.01)
G06F 15/173 (2006.01)

(52) U.S. Cl.
CPC ............... *H04L 67/22* (2013.01); *G06Q 50/01* (2013.01)

(58) Field of Classification Search
CPC ..... H04L 67/14; H04L 67/22; H04L 12/1822; G10L 15/26; H04M 3/2281; H04M 3/42221; G06F 17/30873; G06Q 30/02; G06Q 10/06
USPC ......... 709/204, 224, 202, 203, 205, 227, 245; 715/201; 370/260, 261, 262
See application file for complete search history.

(56) References Cited

U.S. PATENT DOCUMENTS

| 5,960,447 | A  | * | 9/1999  | Holt et al. ..................... 715/201 |
| 6,728,784 | B1 | * | 4/2004  | Mattaway ..................... 709/245 |
| 6,877,007 | B1 | * | 4/2005  | Hentzel et al. ................ 709/224 |
| 2001/0049671 | A1 | * | 12/2001 | Joerg .............................. 706/50 |
| 2002/0065912 | A1 | * | 5/2002  | Catchpole et al. ............ 709/224 |
| 2008/0059474 | A1 | * | 3/2008  | Lim .................................. 707/9 |
| 2009/0319342 | A1 | * | 12/2009 | Shilman et al. ................ 705/10 |
| 2011/0178922 | A1 | * | 7/2011  | Imrey et al. .................... 705/39 |
| 2011/0246490 | A1 | * | 10/2011 | Jonsson ......................... 707/755 |

(Continued)

OTHER PUBLICATIONS

Genevieve Coates, "Macro! What's a Macro?", Sales Force Marketing Cloud, Dec. 22, 2010 url: http://www.radian6.com/blog/2010/12/macro-whats-a-macro/.

*Primary Examiner* — Alina N Boutah
(74) *Attorney, Agent, or Firm* — Vista IP Law Group, LLP

(57) ABSTRACT

A method, system, and computer program product for repetitively executing rules-based configurable business application operations. The method commences by initiating a recording session to record user steps taken within an interactive session, then during the interactive session, retrieving a post from a social media site using and access interface of the social media site. The recording session is saved in a persistent storage for subsequent initiation of a batch processor to replay at least a portion of the saved recording session. The method further comprises selecting one or more rules based on the sentiment of the post, and taking one or more actions in response to the rule. Operations for interactive processing or for batch processing include extracting an author of the post, extracting a sentiment of the post, extracting a category of the post, and performing further actions based on aspects of the post.

20 Claims, 7 Drawing Sheets

(56) References Cited

U.S. PATENT DOCUMENTS

| | | | |
|---|---|---|---|
| 2012/0159337 A1* | 6/2012 | Travilla et al. | 715/738 |
| 2012/0159356 A1* | 6/2012 | Steelberg | 715/760 |
| 2012/0290433 A1* | 11/2012 | England et al. | 705/26.7 |
| 2012/0311618 A1* | 12/2012 | Blaxland | 725/9 |
| 2012/0311684 A1* | 12/2012 | Paulsen et al. | 726/6 |
| 2012/0321281 A1* | 12/2012 | Hilem | 386/241 |
| 2013/0179440 A1* | 7/2013 | Gordon | 707/731 |
| 2013/0198288 A1* | 8/2013 | Jones et al. | 709/204 |
| 2014/0044250 A1* | 2/2014 | Gartner et al. | 379/265.09 |
| 2014/0101259 A1* | 4/2014 | Barone et al. | 709/206 |
| 2014/0127659 A1* | 5/2014 | Barasch et al. | 434/252 |
| 2014/0143058 A1* | 5/2014 | Lessin et al. | 705/14.58 |
| 2014/0223464 A1* | 8/2014 | Moran et al. | 725/12 |

* cited by examiner

SYSTEM FOR REPETITIVELY EXECUTING RULES-BASED CONFIGURABLE BUSINESS APPLICATION OPERATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of user-configurable business applications and more particularly to techniques for automating complex repetitive operations performed through a social media access interface.

BACKGROUND

Many enterprises hold forth a significant presence on the web. Regardless of whether the enterprise is constituted more of bricks than clicks (or more clicks than bricks) certain functions within such enterprises often find it necessary to repeatedly perform certain online operations that are normally performed by an employee or agent using an interactive interface to access online web destinations (e.g., social media sites). Generally, no capability is provided for a user to repeatedly perform such online operations under computer-aided control. As an example, enterprises are subject to various forms of online consumer critique (e.g., via one or more social media sites). An enterprise might be the subject of criticism (whether deserved or undeserved) or praise. In the age of the Internet, an Internet posting (e.g., a post to a social media site) might "go viral" in a very short timeframe. In some cases the enterprise may regard praise as a form of modern-day word-of-mouth advertising, which is often a boon to the enterprise, and steps to proliferate the praise might be taken. Contrary-wise, criticism is generally unwanted, and can be very damaging to the enterprise, even to the point of tarnishing a brand or even to the point of preventing the enterprise from achieving corporate goals. Accordingly, some enterprises have established "watch centers" staffed with persons whose responsibility it is to monitor social media postings and to take notice of posts (whether praise or criticism), and further to take action to stop or foster proliferation, based on the sentiment of the post(s).

Such a "watch center" can be expensive to operate for the enterprise, and the repetitive operations attendant to monitoring the social media sites can become dreary for the staff of the watch center. Legacy systems have attempted to ameliorate the dreary and repetitive nature of performing repetitive operations by using macros, yet the mere playback of macros fails to address (1) the complexities attendant to effective monitoring of the social media sites, and (2) the sheer volume of posts to be processed when monitoring the social media sites.

What's needed are robust, techniques for creating and editing rules-based macros and what is needed are robust implementations of backend processes so as to accommodate rules-aware batch processes.

SUMMARY

The present disclosure provides an improved method, system, and computer program product suited to address the aforementioned issues with legacy approaches. More specifically, the present disclosure provides a detailed description of techniques used in methods, systems, and computer program products for automating repetitive operations using a social media access interface.

Disclosed are methods, system, and computer program products for repetitively executing rules-based configurable business application operations. The method commences by initiating a recording session to record user steps taken within an interactive session, then during the interactive session, retrieving a post from a social media site using and access interface of the social media site. The recording session is saved in a persistent storage for subsequent initiation of a batch processor to replay at least a portion of the saved recording session. The method further comprises selecting one or more rules based on the sentiment of the post, and taking one or more actions in response to the rule. Operations for interactive processing or for batch processing include extracting an author of the post, extracting a sentiment of the post, and extracting a category of the post, among others.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1:
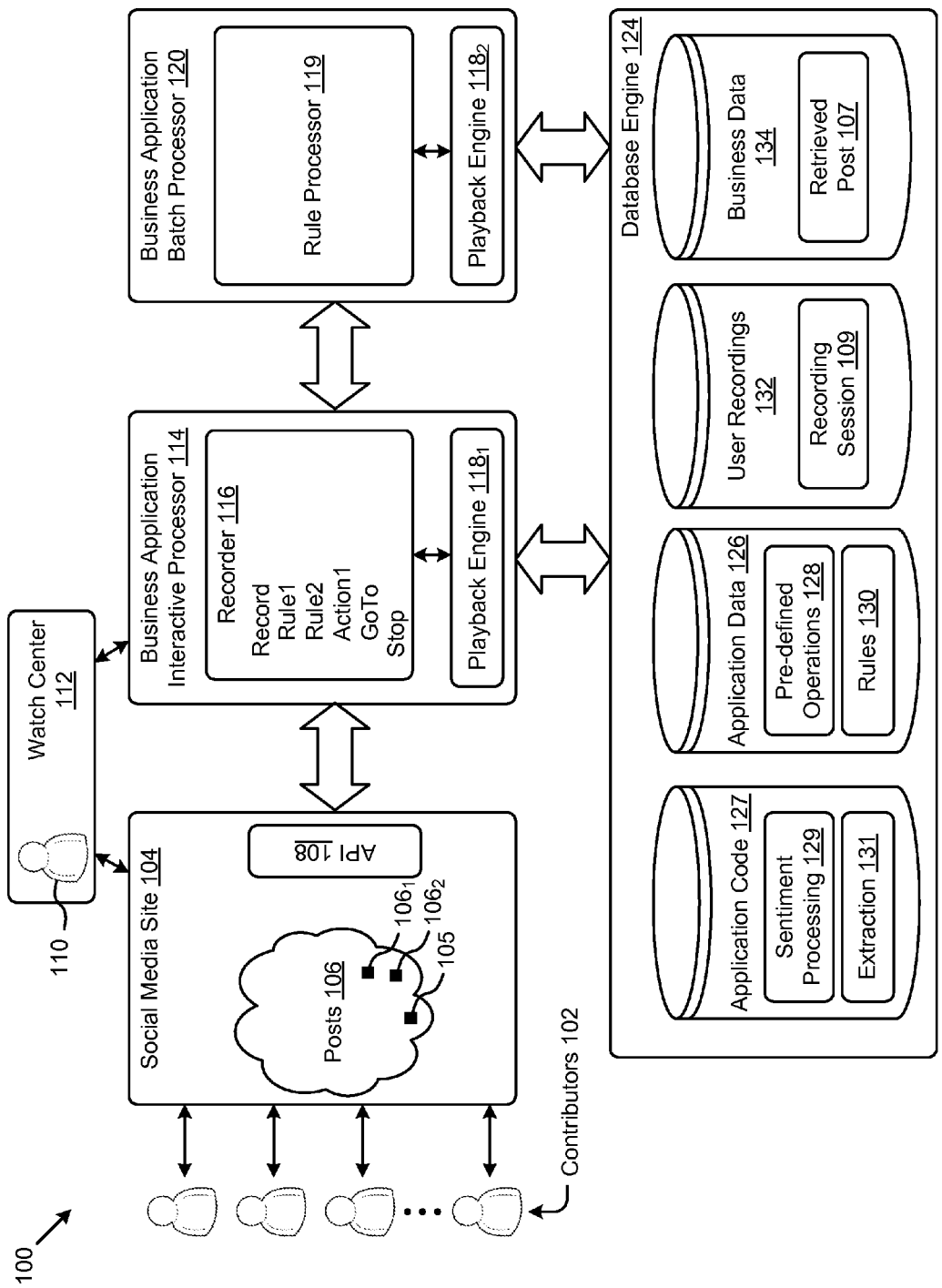
FIG. 1 is a block diagram of an environment comprising a social media site, an interactive processor, a batch processor, and a database engine cooperating as a system for automating repetitive operations using a social media access interface, according to some embodiments.

Some embodiments of the present disclosure are directed to an improved approach for implementing automating repetitive operations using a social media access interface. More particularly, disclosed herein and in the accompanying figures are exemplary environments, methods, and systems for implementing automating repetitive operations using a social media access interface.

Overview

Social media sites provide a global forum in which an enterprise might be the subject of praise, or might be subjected to criticism. In the age of the Internet, an Internet posting (e.g., a post to a social media site) might "go viral" in a very short timeframe. Posts that carry a negative sentiment and/or outright criticism are generally unwanted. Some enterprises have established "watch centers" staffed with persons whose responsibility it is to monitor social media postings and to take notice of unwanted posts, and take corrective action. For example, a staff person in a watch center might notice a recent post, and might detect a negative sentiment. The staff person might post in the form of a neutralizing comment. Or the staff person might offer a clarification in the form of posting the company position as to the topic of the negative post. Or, the staff person might apply one or another rules of engagement in order to carry out the policies of the administration of the enterprise. In most cases, a small set of rules will apply to a large number of posts that would trigger a response from the enterprise's watch center. In many cases it is advantageous to provide repeatability for the application of the policies, and in many cases uniformity if of utmost importance to the brands or images being protected by the enterprise.

In still other cases, carrying out the policies of the administration of the enterprise might involve posting of actual data. In some cases, the posting of actual data might involve up-to-data (e.g., real-time, or near-real-time data), and in some cases responses are drafted around data retrieved from an enterprise database (see FIG. 1).

The disclosed framework provides for editing actions, commands, and rules as might be defined and/or performed by a user in a recording session. Further, the framework supports defining sets of related business operations, which sets can be referred to in a recording, and in a reply. Still further, the disclosed framework allows for a user to prescribe rules as well as the order of operations, and for a user to specify the parameters to the operations.

As earlier indicated, legacy systems have attempted to address the repetitive nature of monitoring using macros, yet the mere playback of macros fails to address (1) the complexities attendant to effective monitoring of social media sites, and (2) the sheer volume of posts to be processed when monitoring the social media sites. A macro system incorporating a robust rules regime is needed.

DEFINITIONS

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1 is a block diagram of an environment 100 comprising a social media site, an interactive processor, a batch processor, and a database engine cooperating as a system for automating repetitive operations using a social media access interface. As an option, the present environment 100 may be implemented in the context of the architecture and functionality of the embodiments described herein. Also, the environment 100 or any aspect therein may be implemented in any desired environment.

As shown, the environment includes a consumer-facing application in the form of a social media site 104. Any number of contributors 102 can interact with the social media site to browse, generate posts 106 (e.g., post $106_1$, post $106_2$, etc.), indicate preferences, or likes or dislikes, etc. Posts and/or other contributor preferences can be used individually or in combination to discern a range of sentiments. Some environments, including the environment 100 of FIG. 1, include one or more enterprise software applications (e.g., business application interactive processor 114) and a data access facility (e.g., database engine 124). As earlier indicated, some enterprises have taken steps to establish "watch centers" (e.g., watch center 112) that are staffed with persons whose responsibility it is to monitor social media postings, to take notice of posts (whether praise or criticism), to take steps to retrieve and preserve such posts (e.g., retrieved post 107), and further to take action to stop or foster proliferation, based on the sentiment of the post(s). Accordingly watch center's staff (e.g., user 110) might interact concurrently (e.g., during a single sitting) with the social media site 104 as well as the business application interactive processor 114. The business application interactive processor might have access to a database engine 124, which in turn might provide access to business data 134. For example, the database engine 124 might respond to a query such as, "is the contributor a client of the enterprise". If it is true that the contributor is a client of the enterprise, then a rule might fire, and it might be possible to carry out an action associated with the rule, and thus (for example) query the database to know further details about the contributor.

In some cases, interaction in the watch center (e.g., interaction performed by user 110) in dealing with the social media site 104 and with the business application interactive processor might be found to be repetitive. In such cases, and following the techniques of the disclosure herein, a user can use a recorder 116 to capture a series of interactive steps, actions, and rules, (e.g., "Rule1", "Rule2", "Decide next step", etc.), which can be stored in a repository for user recordings 132, and can retrieved and replayed (e.g., using a playback engine $118_1$) at a later moment in time. In some cases, a user might find it convenient to replay the captured series of steps from within the business application interactive processor 114. In other cases, for example, if and when an interactive series of steps becomes repetitive (e.g., repetitive to the user) the series of steps (e.g., the steps as recorded by the recorder 116) can be deployed to a business application batch processor 120. The business application batch processor can include a playback engine $118_2$ (as shown). The playback engine $118_2$ can be a cloned instance of the playback engine 118$_1$, or it can be configured to perform more or fewer or different operations than the playback engine 118$_1$. A playback engine 118 can retrieve a recording session 109 using facilities of a database engine and replay the session, substantially the same or identically as was earlier recorded and saved.

Moreover, the business application batch processor can include a rule processor 119. A rule processor serves to process a rule that has fired, which in turn might fire another rule. And, any rule can be associated with one or more rules, and any rule can be associated with one or more actions. Firing a rule will cause the associated actions to be carried out, which in turn may invoke more rules, which in turn may cause its associated actions to be carried out, and so on.

It can be understood that in a dynamic business environment, and in a social media environment that is rapidly changing, rules might need to change quickly in order to respond to rapidly changing sentiment. The aforementioned system offers such flexibility.

Now, discussing the business application interactive processor 114, the function of the underlying application might contain application data. For example, application data 126 might contain screen layouts, and/or images, and/or menus, etc. Further, application data 126 might be configured to hold any number of pre-defined operations 128 and rules 130. The pre-defined operations can be used to facilitate the interactive recording process. For example, a pre-defined operation might be defined to collect a set of smaller operations under a single name (e.g., a name assigned to an operation comprising a set of smaller operations). Also any number of rules 130 can be defined (e.g., possibly in conjunction with a specific business application) and stored with application data 126. Further, application code 127 can operate with application data 126 in order to evaluate rules and initiate actions, which actions can be implemented using any number of pre-defined operations 128 (e.g., sentiment processing 129, extraction 131, etc.). Strictly as examples, the aforementioned operation name can be considered to be a named action, and any two or more actions can be executed in a prescribed order to create a named procedure. Any of the constituent operations within an action can accept input parameters, and the definition of such input parameters can be specified by a user (e.g., a user 110 or by a system administrator).

A configuration as shown within the environment 100 can be considered to be a framework. Such a framework can be configured to record operations, and then to replay the operations so as to repetitively execute the recorded business application operations.

Further, the framework can store and manage the aforementioned rules. Strictly as an example, the rules might codify the public-facing policies of the enterprise. And, facilities within such a framework can associate one or more rules to one or more actions. As an example of such a rule tied to an action, if the policy of the enterprise is to respond to a negative social media post with a positive social media post, then a rule might be defined to initiate actions to author a positive post, and submit the positive post as a comment 105 to the negative post. Or, the policy of the enterprise might be to not respond to an aggrieved social media post if the aggrieved social media post has a high concentration of expletives, and in such a case, a rule might be defined to merely log the aggrieved post (see FIG. 2).

Figure 2A:
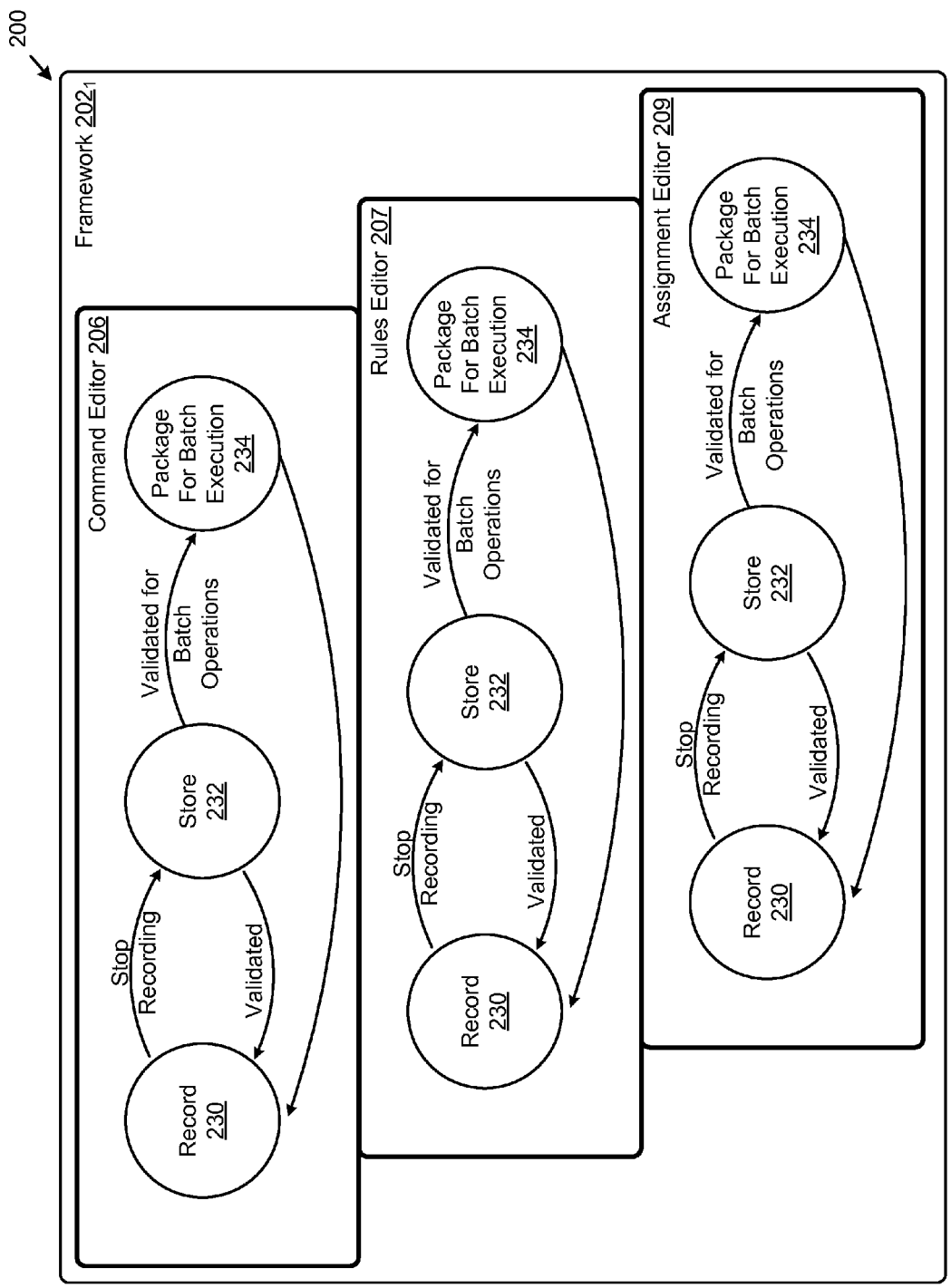
FIG. 2A shows state charts comprising editors within a framework for use in a system for automating repetitive operations using a social media access interface, according to some embodiments.

FIG. 2A shows state charts 200 comprising editors within a framework for use in a system for automating repetitive operations using a social media access interface. As an option, the present framework 202 (e.g., framework 202$_1$) may be implemented in the context of the architecture and functionality of the embodiments described herein. Also, the framework 202$_1$ or any aspect therein may be implemented in any desired environment.

The state charts within framework 202$_1$ comprise a command editor 206, a rules editor 207, and an assignment editor 209. As shown, a user of any of the editors might traverse through several states, such as recording user commands to define a named procedure (e.g., see record 230), storing a procedure (e.g., see store 232), and packaging the procedure for batch execution (e.g., see package procedure for batch execution 234). Once a user command has been prepared, stored and packaged, the stored procedure can be operated upon by a batch processor (see FIG. 2B).

Figure 2B:
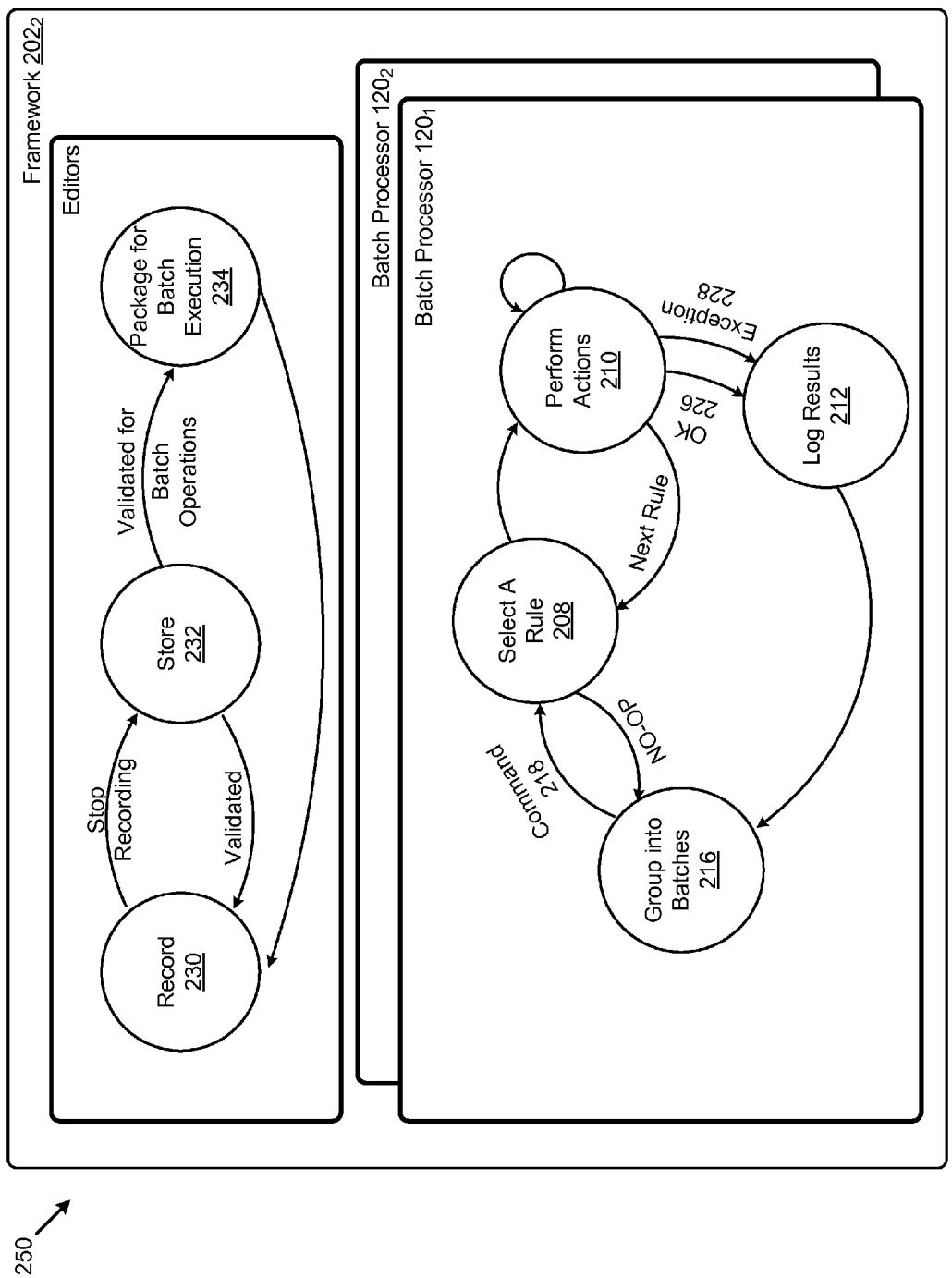
FIG. 2B shows state charts within a framework comprising editors and batch processors for use in a system for automating repetitive operations using a social media access interface, according to some embodiments.

FIG. 2B shows state charts 250 within a framework 202$_2$ comprising editors and batch processors for use in a system for automating repetitive operations using a social media access interface. As an option, the present framework 202$_2$ may be implemented in the context of the architecture and functionality of the embodiments described herein. Also, the state charts or any aspect therein may be implemented in any desired environment.

The batch processor can be configured to perform a variety of procedures. In the specific example as shown in FIG. 2B, the batch processor is configured for traversing through several states in order to process social media posts, take prescribed actions, and log results. More specifically, the batch processor is configured to group workloads pertaining to accessing a social media site into batches (e.g., see group into batches 216), possibly using an application programming interface (e.g., API 108 of FIG. 1). The result of an operation to group workloads might result in isolation of an a priori known or otherwise previously-stored command or message type for which command or message type there is are one or more prescribed rules. In some cases the command 218 might be associated with a specific instance of a rule, which in turn is associated (directly or indirectly) with another rule. Thus, the operation to select a rule 208 can select from a range of pre-defined or user-recorded rules, and then proceed to states for performing the selected actions (see perform actions 210). The performance of the action might be successful or otherwise complete as intended (e.g., see OK 226), or it might not complete (see exception 228). Or, even after executing the operation to select a rule 208, there might not be any rule that fires and processing returns to an earlier traversed state.

In the case that a rule is selected and corresponding actions are performed, processing might return to get a next rule, or if all rules to be fired have been processed, then processing advances (e.g., see the OK 226 path, or see the exception 228 path), then processing can proceed to a logging function (see operation to log results 212). After logging the results, the batch processor returns to group workload items into batches, and the cycle continues.

Multiple batch processors might be deployed as shown (see business application batch processor 120, etc.). Moreover a batch processor can process any number of loops, as is shown in the protocol of FIG. 3.

Figure 3:
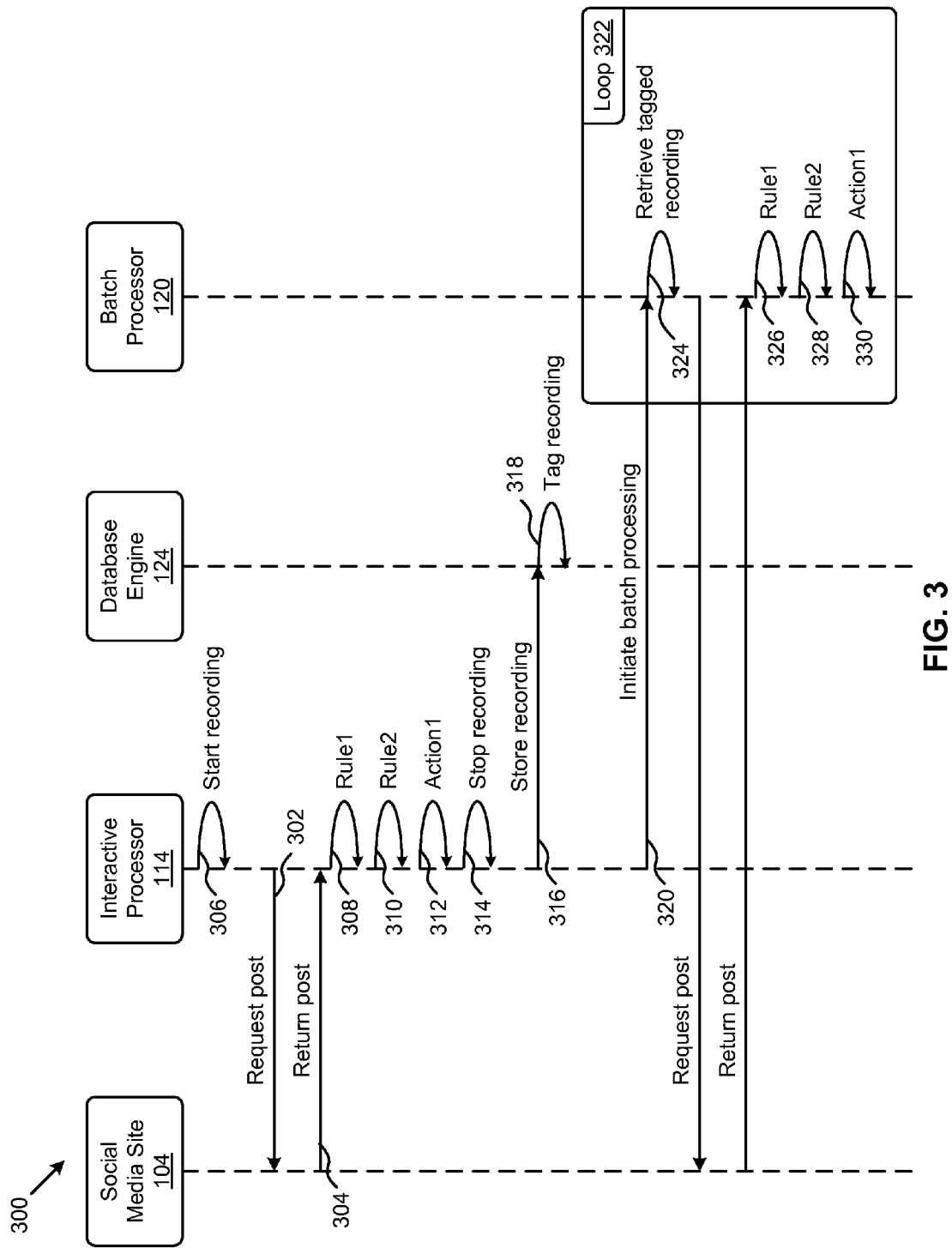
FIG. 3 is an example protocol used in a system for automating repetitive operations using a social media access interface, according to some embodiments.

FIG. 3 is an example protocol 300 used in a system for automating repetitive operations using a social media access interface. As an option, the present protocol 300 may be implemented in the context of the architecture and functionality of the embodiments described herein. Also, the protocol 300 or any aspect therein may be implemented in any desired environment.

As shown, a recording is started (see operation 306) at an interactive processor 114 (e.g., an interactive processor being used by a user), and a post is requested from the social media site 104 (see message 302). The social media site returns the post (see message 304) to the requestor. Then, possibly based on some analysis by the requestor, the interactive processor (e.g., as being used by a user) might apply one or more rules, which rules in turn might initiate the execution of Rule1 (see operation 308) and execution of Rule2 (see operation 310), and corresponding commands or operations (see Action1 312), and then stop the recording (see operation 314).

The recording then can be sent to a database engine 124 for storage (see message 316). The database engine 124 (or any other processor) can receive the recording and perform additional processing on the recording, possibly including tagging the recording (see operation 318). For example, a recording might be tagged with an action name, a date stamp, a version number, or other identifying information, which information can be retrieved when initiating batch processing (see operation 320).

Now, having a tagged recording, a business application batch processor 120 might be called upon to retrieve the tagged recording (see operation 324) and perform playback of the tagged recording, possibly in a loop (see loop 322). In some cases a business application batch processor 120 is called upon by a user of a business application interactive processor 114. In such a case, a business application batch processor 120 performs against the recording (e.g., see of Rule1 at operation 326) and see Rule2 at operation 328), and see Action1 (operation 330).

As can be understood, a computer implemented method for automating repetitive operations using a social media access interface can perform the steps of: initiating a recording session to record user steps taken within an interactive session, retrieving a post from a social media site using the social media access interface while still within the interactive session, performing one or more operations to process the retrieved post, and saving the recording session. A batch processor can be initiated to replay all or portions of the saved recording session, thereby saving many steps as may have been captured during the recording session.

As such, the protocol 300 is merely an example protocol, and any number of steps and/or tests can be performed and recorded. Moreover the post or other object operated upon during the batch processing can be a different instance of the type of object operated on during the interactive session. Further any forms or processing can be carried out on any of the objects retrieved via the social media access interface, and any set of interactive operations can occur interleaved with any set of batch operations. The operation sequence of FIG. 4 is offers further examples.

Figure 4:
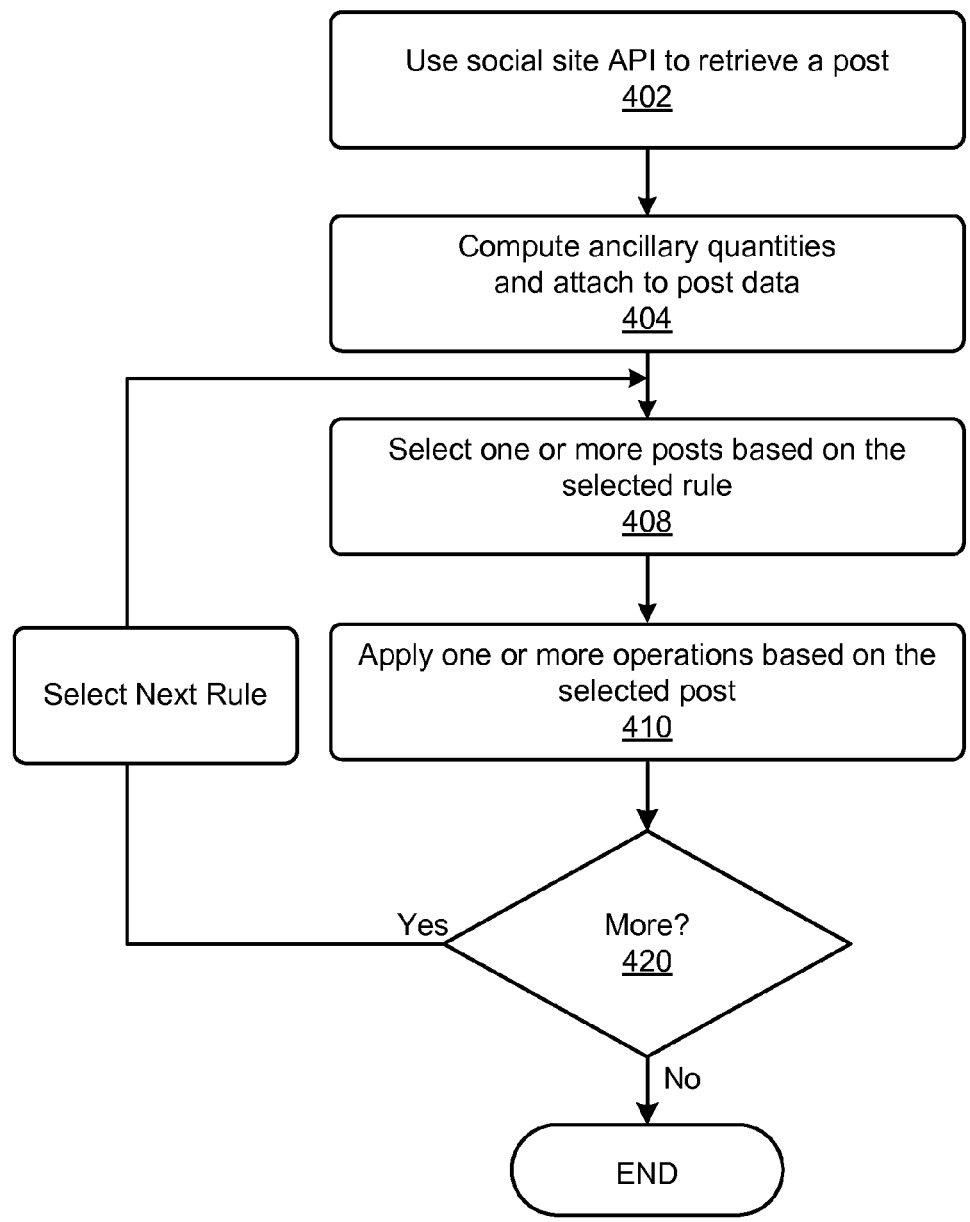
FIG. 4 is an example operation sequence as used in a system for automating repetitive operations using a social media access interface, according to some embodiments.

FIG. 4 is an example operation sequence 400 as used in a system for automating repetitive operations using a social media access interface. As an option, the present operation sequence 400 may be implemented in the context of the architecture and functionality of the embodiments described herein. Also, the operation sequence 400 or any aspect therein may be implemented in any desired environment.

The example operation sequence 400 is merely one possible sequence. Individual operations or pairs or groups of operations of operation sequence 400 can be recorded using an editor or recorder (e.g., recorder 116) and played back using a playback engine (e.g., see playback engine $118_1$, playback engine $118_2$) on either a business application interactive processor 114 or on a business application batch processor 120.

In some cases a human operator might perform better than a computer-implemented procedure. For example, during development of a computer-implemented procedure to detect and classify sentiment, it might be that the human operator can detect certain sentiments which corresponding sentiments have not been yet codified in the computer-implemented procedure. Accordingly, it may be felicitous to support interleaving of interactive operations with batch operations. In the computer-implemented procedure, all (or none) of the shown operations can be executed by a business application interactive processor 114 and all (or none) of the shown operations can be executed by a business application batch processor 120.

For automating repetitive operations using a social media access interface implementation, and more particularly for using the aforementioned computer-implemented procedures to carry out a policy for responding to a post (e.g., an aggrieved post, a post of praise, etc.), processing a post can proceed in accordance with any of the aspects of Table 1 and/or any of the aspects of Table 2.

Strictly as example, a raw post (e.g., just the text) can be extracted, as well as can be extracted the date/time the post was created (see row 1.2), the post title (if any; see row 1.3), the number of "likes" (see row 1.4), the number of forwards or re-posts (see row 1.5), quantification of "favorite" (see row 1.6), and etcetera.

TABLE 1

Processing a Post and Author of Post

| Row | Post | Author | Enrichment |
|---|---|---|---|
| 1.1 | Post Content | Connections Count | Sentiment |
| 1.2 | Post Created | Email ID | Category |
| 1.3 | Post Title | User Name | Topic-Keyword/Entity |
| 1.4 | No. of Likes | First Name | Theme |
| 1.5 | No. of Re-posts | Last Name | — |
| 1.6 | Is Favorite | Full Name | — |

In addition to the aspects of the post that can come directly from the post (or via an initial call or calls to an API), a number of connections to the author can be retrieved, as well as retrieving the author's screen name, alias, email ID, and real name. Further, processing on the aspects of the post and/or aspects of the author can be initiated to enrich the information available as pertains to the post and/or author. Strictly as examples, the sentiment of the post can be extracted, as well as the category, topic and theme.

Using the attributes of the post, its author (and any extracted or learned characteristics), it is possible to create a rule. For example, in order to catch aggrieved messages on a company's Facebook page, it is possible to set up a rule with quantitative conditions such as [(Domain="facebook.com") AND (Sentiment="Negative" OR Sentiment="Very Negative")].

For automating repetitive operations using a social media access interface and, more particularly, for using the aforementioned computer-implemented procedures to carry out a policy for response to a post (e.g., an aggrieved post, a post of praise, etc.), processing a post can proceed in accordance with any of the aspects of Table 1 and take any of the actions of Table 2.

TABLE 2

Processing a Post with an Action

| Row | Possible Actions |
|---|---|
| 2.1 | Tag post |
| 2.2 | Tag author |
| 2.3 | Add note to post |
| 2.4 | Discard post |

TABLE 2-continued

Processing a Post with an Action

| Row | Possible Actions |
|---|---|
| 2.5 | Create marketing response |
| 2.6 | Set post priority |
| 2.7 | Override post sentiment |
| 2.8 | Override post category |

As earlier introduced, a database engine 124 might be present in some environments, and such a database engine can be queries to find information about the author or post, and can cross-correlate such information to other forms of business data 134. Accordingly, policies based on rules and actions can be coded to any level of complexity. Strictly as an example, a rule and action might be codified to first identify messages of a certain characteristic (e.g., an aggrieved sentiment), and one or more applicable actions can be prescribed (e.g., tag the post as Classification="SUPPORT-FOLLOW UP" and/or tag the post as Priority="HIGH").

Table 3 gives a representative listing of rules and corresponding actions.

TABLE 3

Processing a Post with an Action

| Row | Rule | Corresponding Action |
|---|---|---|
| 3.1 | Is author already a registered customer? | Publicly post a coupon for that author |
| 3.2 | Is author in a particular geography? | Post a referral to a local outlet |

As shown in operation sequence 400, the operation sequence commences upon retrieving a post (see operation 402), then computing ancillary quantities (see operation 404), and using application code to enrich the post with classification information and sentiment determinations. Rules can fire based on any aspect of the post, and vice-versa, posts can be selected based on a selected rule (see operation 408) and the firing of a rule can cause execution of more operations (see operation 410) based on the one or more selected posts that were selected in operation 408. If there are multiple rules that fire, or if the firing of one rule causes the firing of other rules, then the test 420 will return to select the next additional rules to evaluate. It can happen that the firing of a next rule causes selection of more posts.

Additional Embodiments of the Disclosure

Figure 5:
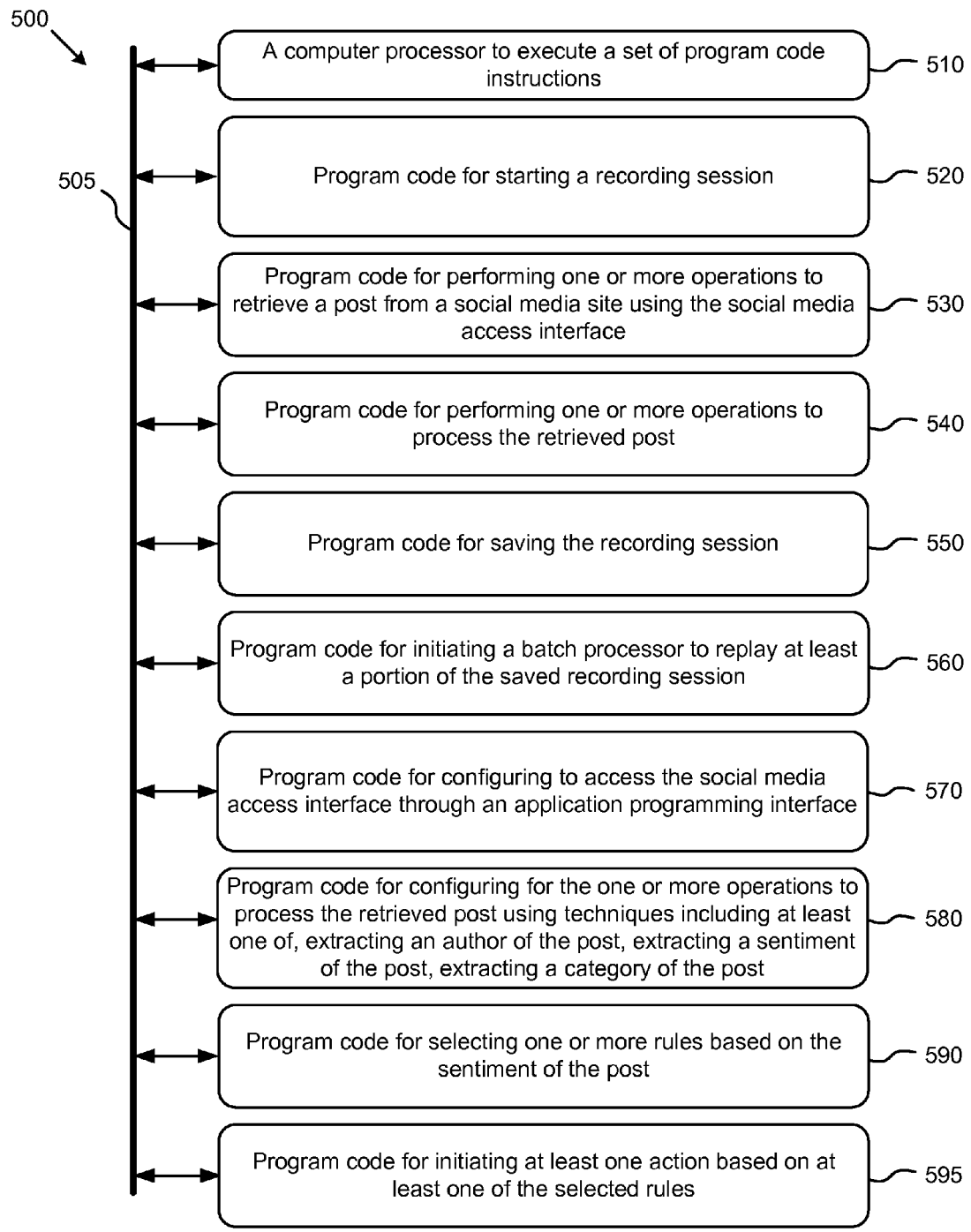
FIG. 5 is a flow chart of a system for automating repetitive operations using a social media access interface, according to some embodiments.

FIG. 5 is a flow chart of a system for automating repetitive operations using a social media access interface, according to some embodiments. As an option, the present system 500 may be implemented in the context of the architecture and functionality of the embodiments described herein. Also, the system 500 for or any operation therein may be implemented in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a computer processor to execute a set of program code instructions (see module 510) and modules for accessing memory to hold program code instructions to perform: starting a recording session (see module 520); performing one or more operations to retrieve a post from a social media site using the social media access interface (see module 530); performing one or more operations to process the retrieved post (see module 540); saving the recording session (see module 550); initiating a batch processor to replay at least a portion of the saved recording session (see module 560); configuring to access the social media access interface through an application programming interface (see module 570); configuring for the one or more operations to process the retrieved post using techniques including at least one of, extracting an author of the post, extracting a sentiment of the post, extracting a category of the post (see module 580); selecting one or more rules based on the sentiment of the post (see module 590); and initiating at least one action based on at least one of the selected rules (see module 595).

System Architecture Overview

Figure 6:
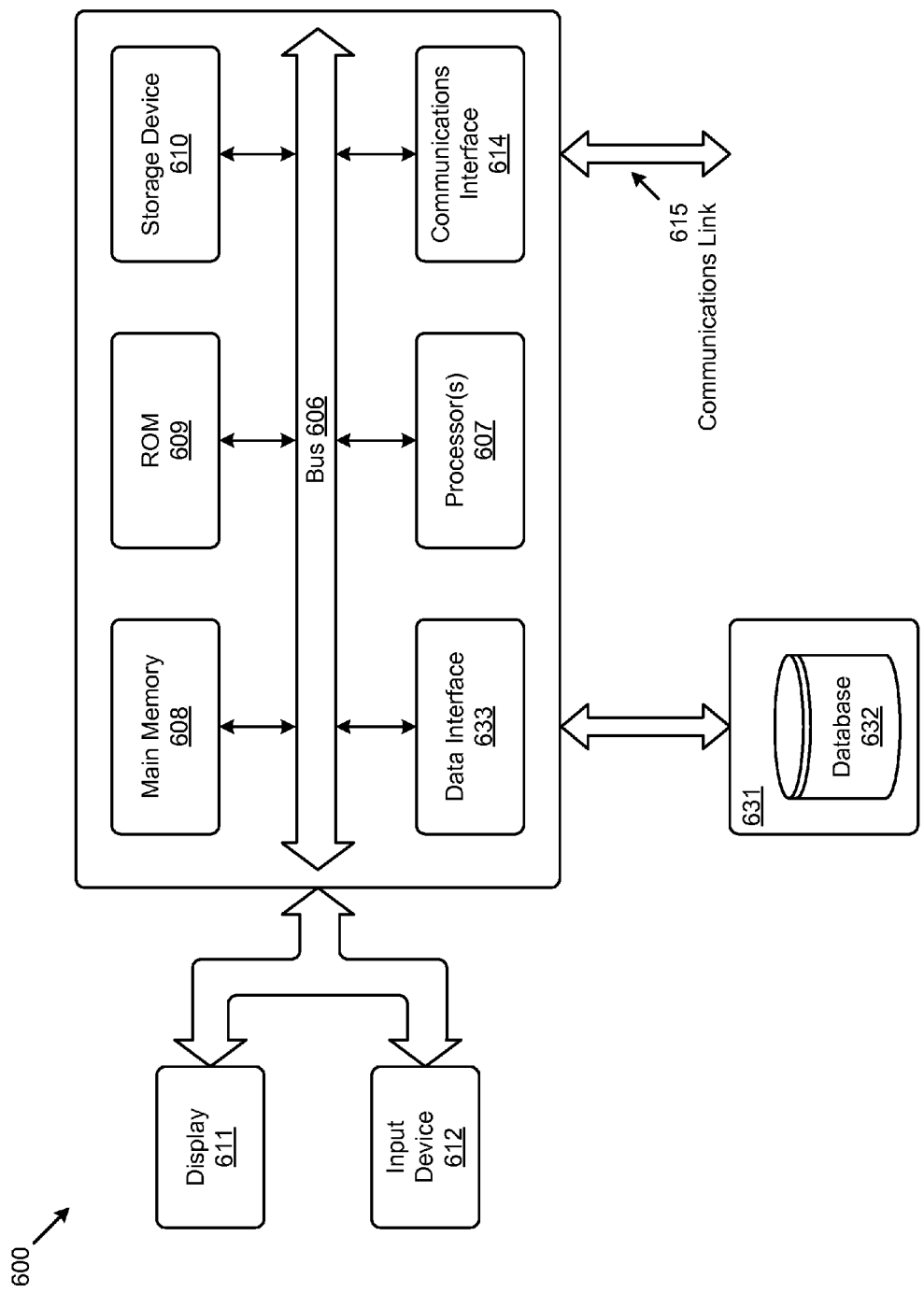
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for automating repetitive operations using a social media access interface, the method comprising:
    initiating, using a computer, a recording session to record user steps taken within an interactive session, wherein the user steps being recorded are associated with a post retrieved, from within the interactive session, from a social media site using the social media access interface;
    saving the recording session; and
    initiating a batch processor to replay at least a portion of the saved recording session.

2. The method of claim 1, further comprising selecting at least one rule based at least in part on the post.

3. The method of claim 2, further comprising selecting at least one additional post based at least in part on the at least one selected rule.

4. The method of claim 1, further comprising processing the retrieved post by performing at least one of, extracting an author of the retrieved post, extracting a sentiment of the retrieved post, extracting a category of the retrieved post.

5. The method of claim 4, further comprising selecting one or more rules based at least in part on the sentiment of the retrieved post.

6. The method of claim 5, further comprising performing at least one associated action based at least in part on the selected one or more rules.

7. The method of claim 1, wherein the social media access interface is an application programming interface.

8. The method of claim 1, wherein the retrieving further comprises performing one or more operations to process the retrieved post.

9. A computer system for automating repetitive operations using a social media access interface, comprising:
    a computer processor to execute a set of program code instructions; and
    a memory to hold the program code instructions, in which the program code instructions comprises program code to perform,
    initiating a recording session to record user steps within an interactive session, wherein the user steps being recorded are associated with a post retrieved, from within the interactive session, from a social media site using the social media access interface;
    saving the recording session; and
    initiating a batch processor to replay at least a portion of the saved recording session.

10. The computer system of claim 9, further comprising program code for selecting at least one rule based at least in part on the post.

11. The computer system of claim 10, further comprising program code for selecting at least one additional post based at least in part on the at least one selected rule.

12. The computer system of claim 9, further comprising program code for processing the retrieved post by performing at least one of, extracting an author of the retrieved post, extracting a sentiment of the retrieved post, extracting a category of the retrieved post.

13. The computer system of claim 12, further comprising program code for selecting one or more rules based at least in part on the sentiment of the retrieved post.

14. The computer system of claim 13, further comprising program code for performing at least one associated action based at least in part on the selected one or more rules.

15. A computer program product embodied in a non-transitory computer readable medium, the computer readable medium having stored thereon a sequence of instructions which, when executed by a processor causes the processor to execute a process to implement automating repetitive operations using a social media access interface, the process comprising:
    initiating a recording session to record user steps taken within an interactive session, wherein the user steps being recorded are associated with a post retrieved, from within the interactive session, from a social media site using the social media access interface;
    saving the recording session; and
    initiating a batch processor to replay at least a portion of the saved recording session.

16. The computer program product of claim 15, further comprising instructions for selecting at least one rule based at least in part on the post.

17. The computer program product of claim 16, further comprising instructions for selecting at least one additional post based at least in part on the at least one selected rule.

18. The computer program product of claim 15, further comprising instructions for processing the retrieved post by performing at least one of, extracting an author of the retrieved post, extracting a sentiment of the retrieved post, extracting a category of the retrieved post.

19. The computer program product of claim 18, further comprising instructions for selecting one or more rules based at least in part on the sentiment of the retrieved post.

20. The computer program product of claim 19, further comprising performing instructions for at least one associated action based at least in part on the selected one or more rules.

* * * * *